WESLEY A. ROBINSON
WILLIAM W. SIMMONS
JAMES M. PAOLOZZI
INVENTORS,
BY
Daniel T. Anderson
ATTORNEY.

United States Patent Office 3,532,891
Patented Oct. 6, 1970

3,532,891
MEANS FOR STABILIZATION OF
TRANSVERSE POCKELS' CELLS
William W. Simmons, Palos Verdes Peninsula, James M.
Paolozzi, Redondo Beach, and Wesley A. Robinson, El
Segundo, Calif., assignors to TRW Inc., Redondo Beach,
Calif., a corporation of Ohio
Filed Dec. 26, 1967, Ser. No. 693,664
Int. Cl. H04b 9/00
U.S. Cl. 250—199                                  11 Claims

ABSTRACT OF THE DISCLOSURE

This specification discloses a transverse Pockels' cell whose electrooptic effects are electrically temperature compensated and stabilized by an optic electronic feedback control loop network.

BACKGROUND OF THE INVENTION

Field of the invention

The invention relates to electrooptic effect devices and systems and more particularly to improvements in the efficiency and stabilization thereof.

Although the present invention finds particularly advantageous utilization in the field of temperature stabilization of a laser system embodying a Pockel's cell device therewithin for signal conditioning control, and although, in the cause of brevity and clarity of presentation much of the following discussion and description of examples of the invention are directed theretoward, it is expressly to be understood that the advantages of the invention are equally well manifest in other fields wherein it may be desirable to control and stabilize an electrooptic effect device or the like, whether or not such system utilize laser components; and whether or not the effects to be compensated are thermal, mechanical, electrical, or the like.

Discussion of the prior art

In the rapidly expanding field of the development of practical, economic, and reliable laser systems, it is often advantageous to employ modulation techniques utilizing an optic modulator means disposed within the laser. The modulation process may include cavity Q-switching, coupling modulation, or others. In any event, the object is generally to alter rapidly the polarization of the laser light as from one state or direction thereof to an orthogonal one.

Solid state electrooptic devices are particularly well adapted for such utilization; and systems utilizing Kerr cells, for example, are known in the prior art. The use of such devices as Kerr cells, however, is costly in terms of complexity and power supply requirements because of its very high voltage requirements for achieving useful and practical electrooptic effects.

It is, accordingly, an object of the present invention to provide electrooptic apparatus which is not subject to these and other disadvantages and limitations of the prior art.

It is another object to provide such apparatus which is electrically stabilized with regard to perturbations from certain electrical or optical characteristics.

It is another object to provide such solid state electrooptic apparatus which is electrically stable with respect to thermal drift and other perturbing effects.

It is another to provide an improved efficiency laser system utilizing electrically stabilized solid state electrooptic apparatus in combination therewith.

It is another object to provide such apparatus which is highly economic with regard to system complexities including modulator power supply requirements.

SUMMARY OF THE INVENTION

Very briefly, these and other objects are achieved in accordance with the structural features of an example of the invention which includes a solid state, transverse Pockels', electrooptic component interposed optically within a laser cavity. The electrooptic voltage is impressed transversely to the optic path, across a desired opposed pair of crystal faces in accordance with a desired program of switching or other beam modulation achievable by the polarization control in the crystal. In this example, it is desired that plane polarized light incident on the modulator crystal emerge as plane polarized light either parallel or orthogonal to the initial plane of polarization. Optically downstream from the crystal, a quarter-wave plate is interposed in a manner to cause the output beam to become circularly polarized. The beam is then split into equal portions, with each portion being analyzed by polarized analyzers whose axes are respectively orthogonal and parallel to the direction polarization of the light incident upon the modulating crystal.

The analyzer output signals are then separately detected and impressed upon the input terminals of a difference amplifier. The latter is of the character to provide a DC output signal proportional to the difference of the squares of the amplitudes of the light incident upon the detectors. This error signal is then fed back to the electric signal input faces of the modulator crystal as a correction bias signal to maintain equal amplitudes of the orthogonally polarized light beams incident upon the separate photo detectors.

Further details of these and other novel features and their principles of operation as well as additional objects and advantages of the invention will become apparent and be best understood from a consideration of the following description, when taken in connection with the accompanying drawing which is presented by way of an illustrative example only.

DESCRIPTION OF THS PREFERRED EMBODIMENT

Figure 1:
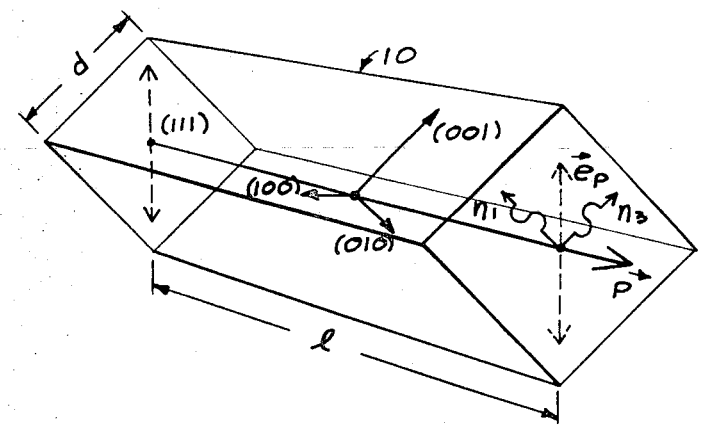
FIG. 1 is a simple line, three-dimensional diagram of an example of a transverse electrooptic effect crystal useful in describing the structure and operation of the invention; and, FIG. 2 is a schematic diagram of an example of a modulated laser system constructed in accordance with the principles of the present invention.

With specific reference now to the figures in more detail, it is stressed that the particulars shown are by way of example and for purposes of illustrative discussion only and are presented in the cause of providing what is believed to be the most useful and readily understood description of the principles and structural concepts of the invention. In this regard no attempt is made to show structural details of the apparatus in more detail than necessary for a fundamental understanding of the invention. The description taken with the drawing will make it apparent to those skilled in the arts of modern electronics and optics how the several forms of the invention may be embodied in practice. Specifically, the detailed showing is not to be taken as a limitation upon the scope of the invention, which is defined by the appended claims forming, along with the drawing, a part of this specification.

In FIG. 1, an example of a 45° Z-cut KDP transverse Pockels' cell 10 is illustrated having representative crystalline axes (100) (010 and (001), each orthogonal to the longitudinal axis $\vec{P}$ along which, in this example, the incident plane polarized light, as from a laser, not shown, traverses the length $l$ of the cell. The direction of polarization is taken, again for this example, to be $\vec{cp}$ along the axis (111). As indicated at the right hand and, as viewed in the drawing, of the crystal, components of the plane polarized light along the axis (001) propagate in the $\vec{P}$ direction with refraction index $n_3$; while that component along the axis (010) propagates in accordance with a refraction of index $n_1$. Thusly it may be seen that, in general, plane polarized light impressed upon the left hand face with polarization direction along (111) emerges at the right hand end with elliptical polarization depending upon the relative effective phase lengths of the $n_1$ versus $n_2$ paths.

In the present example, it is desired for one state of operation, to cause the light output of the crystal to be again plane polarized parallel to its input polarization. This requires that the phase angle lengths of the $n_1$ and $n_2$ differ by $n\pi$ radians where $n$ is any even integer. For another state of operation, it may, for example, be desired to switch the direction of polarization of the emergent light signal to the orthogonal or (100) direction. This is achieved by application of a control voltage pulse across the $n_3$ (001) crystal faces of sufficient magnitude to cause the $n_3$ effective path length to be different from that for the $n_1$ component by $m\pi$ radians where $m$ is any odd integer. In either event, a primary object of the present invention is to control and stabilize these conditions for the crystal electronically by application of a bias voltage across the (001) faces.

Figure 2:
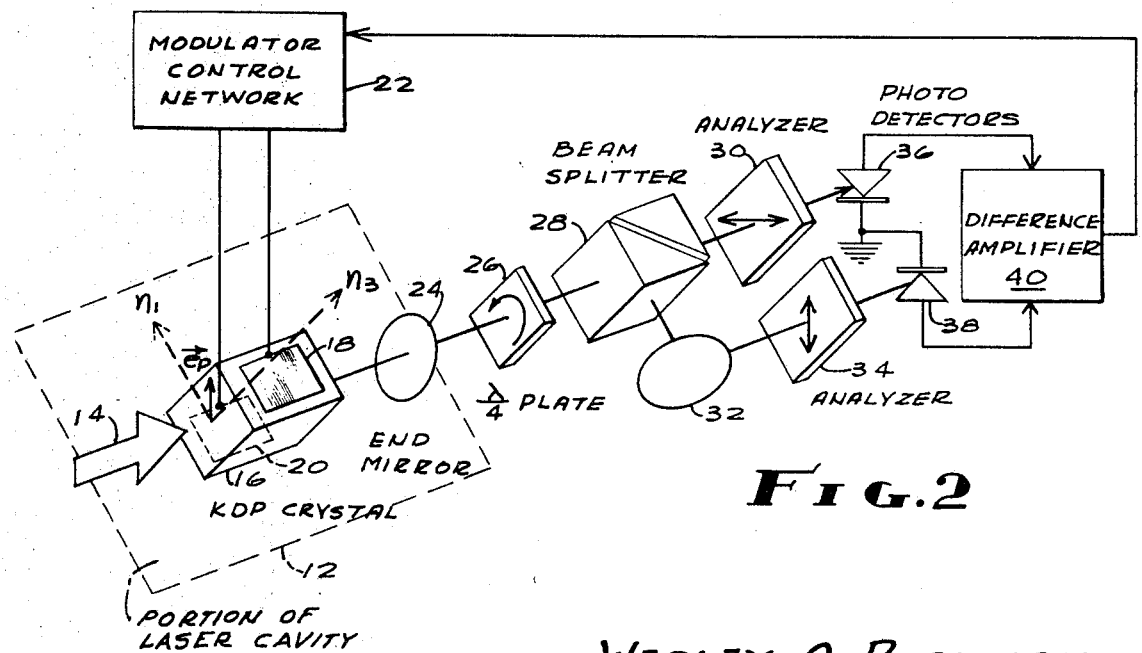

Referring to FIG. 2, the example of the invention illustrated includes a portion of a laser optic cavity 12 within which is disposed a KDP crystal which may be presumed to be similar in essential respects to that shown in FIG. 1. The plane polarized light, indicated at 14, from the active laser material is impressed upon the input end of the crystal 16 with its direction of polarization parallel to the $\vec{ep}$ direction, as shown, and symmetrically between the (001) and (010) axes indicated at $n_3$ and $n_1$ respectively. The crystal electrodes 18, 20 are shown affixed to the $n_3$ (001) faces for achieving the desired primary electrooptic effect, as well as the bias, correction effects, by application thereto of control and bias voltages, respectively, from the modulator control network 22.

A portion of the light emergent from the crystal 16 passes through the laser cavity end mirror 24 and traverses a quarter-wave plate 26 causing the plane polarized light (assuming the maintenance of the desired correction effects) to become circularly polarized. The circularly polarized beam is then evenly divided by a beam splitter 28 creating a first beam portion through a horizontal (perpendicular to the polarization of the input laser beam 14) polarizer analyzer 30 and a second beam portion to pass, via a mirror 32, through a vertical (parallel to the polarization of the light 14) polarizer analyzer 34. The optic output signals of the analyzers 30, 34 are then impressed upon, in this example, square law photodetectors 36, 38, respectively, which each provide an electrical output signal proportional to the power or the square of the amplitude of the input optic signals. These electric signals may be seen to be equal if the light output of the crystal is plane polarized and therefore circularly polarized after the quarter-wave plate 26. If, on the other hand, the light output of the crystal is elliptically polarized, then the photodetector output voltages are unequal. The conventional difference amplifier 40 compares the two signals or inputs and provides an error signal output, the polarity and amplitude of which are proportional to the sense and magnitude of the difference between the unequal detector outputs. The difference amplifier output signal is then fed into the modulator control network 22 which generates a bias feedback control voltage applied to the electrodes 18, 20 to cause a nulling of the undesired imbalance in the electrooptic effects of the crystal 16.

For a more detailed and mathematical understanding of the operation of the invention, it may be noted that for plane polarized light entering the crystal with polarization in the $\vec{ep}$ direction and having an amplitude A, the emergent beam components along $n_1$ and $n_3$ are $$\frac{A}{\sqrt{2}} \exp i\left(\omega t - \frac{2\pi n_1 l}{\lambda}\right) \text{ and } \frac{A}{\sqrt{2}} \exp\left(\omega t - \frac{2\pi n_3 l}{\lambda}\right)$$

where $\lambda$ is the light wavelength and $\omega = 2\pi c/\lambda$. The desired condition of plane polarized parallel input and emergent light is achieved when the relative phase of these two components is $n\pi$ where $n$ is any even integer;

$$\frac{\pi l}{\lambda}(n_1 - n_3) = n\pi \tag{1}$$

For a given length $l_0$, at temperature T, a fixed bias voltage $V_0$ is applied to the electrodes 18, 20 such that (1) is met, i.e., $$\frac{\pi l_0}{\lambda}\left(n_1 - n_3 - 1/2 n_1^3 r \frac{V_0}{d}\right) = n\pi \tag{2}$$

where $r$ is the appropriate electrooptic coefficient ($r_{63} \simeq 26.4 \times 10^{-12}$ m./volt for KDP) and $d$ is the width of the crystal in the (001) direction.

When the length changes from $l_0$ to $l_0 + \Delta l$, a control voltage $\Delta V$ is applied in series with the bias voltage $V_0$ to compensate for the change. The relation between temperature changes $\Delta T$ and $\Delta V$ is then $$n\lambda \alpha \Delta T = 1/2 n_1^3 r \frac{l_0}{d} \Delta V \tag{3}$$

where $\alpha$ is the linear expansion coefficient of the crystal.

In terms of the half-wave retardation voltage $$V_{1/2} = \frac{\lambda}{n_1^3 r}\left(\frac{d}{l_0}\right),$$

$$\frac{\Delta V}{V_{1/2}} = 2n\alpha \Delta T \tag{4}$$

Using Equations 1 and 4, $$\frac{\Delta V}{\Delta T} = \frac{2l_0}{\lambda} V_{1/2}(n_1 - n_3)\alpha \simeq 120 \text{ volts/degree}$$

Thus it is shown that stabilization with respect to temperature change is important in practical transverse Pockels' cell combinations of the general character described.

Referring to FIG. 2 and assuming an output signal at the end mirror 24 which is somewhat elliptically polarized, the amplitudes of the $n_1$ and $n_3$ components are $$A_1 = \frac{A}{\sqrt{2}} \cos(\omega t - \delta)$$

$$A_3 = \frac{A}{\sqrt{2}} \cos \omega t \tag{5}$$

where $\delta$ is the additional phase shift due, for example, to temperature sensitive crystal length changes;

$$\delta \simeq \frac{n\pi n_1 l \alpha \Delta T}{\lambda} \tag{6}$$

The quarter-wave plate 26 introduces a $\pi/2$ radian phase retardation on the $A_3$ component and the beam portions incident upon the detectors 36, 38 have amplitudes (neglecting [symmetrical] losses)

$$A_{36} = \frac{A}{\sqrt{2}}\left(\cos\frac{\delta}{2} - \sin\frac{\delta}{2}\right); A_{38} = \frac{A}{\sqrt{2}}\left(\cos\frac{\delta}{2} + \sin\frac{\delta}{2}\right) \tag{7}$$

respectively. The voltage ouputs from the square law detectors are, accordingly, proportional to $$\frac{A^2}{2}(1 - \sin \delta) \text{ and } \frac{A^2}{2}(1 + \sin \delta) \tag{8}$$

When these signals are processed through the DC difference amplifier 40, the error signal $$\Delta V \text{ proportional to } V_2-V_1=A^2=\sin\delta \simeq A^2\delta \quad (9)$$

is generated as described earlier hereinabove. It may further be noted that the loop gain G, denoted by the product of the conversion gain of a photodetector 36 or 38 and the DC gain of the difference amplifier 40 is $$G \simeq \frac{1}{\pi}\left(\frac{n_1-n_3}{n_1}\right)\left(\frac{V_{1/2}}{A^2}\right) \quad (10)$$

using Equations 1, 3, 4 and 9. For KDP, the significant parameters are $$V_{1/2}=\frac{d}{l}\times 9.1\times 10^3 \text{ volts}\simeq 810 \text{ volts}\left(\text{for }\frac{d}{l}=.1\right)$$

$$n_1-1.51, \text{ and } n_1=.04$$

For a typical laser configuration, $A^2 \simeq 1$ mw. is a reasonable value. With these numerical values, $G=5$ volts/mw., which clearly is feasible for application of the character contemplated and discussed.

There has thus been disclosed and described an example of a stabilized transverse Pockels' cell electrooptical system which achieves the objects and exhibits the advantages set forth herein above.

The embodiments of the invention in which an exclusive property or privilege is claimed are defined as follows:

1. Apparatus for stabilizing an electrooptic device comprising:
    an electrooptic device of the character having a predetermined longitudinal axis of optic propagation for transmission of plane polarized light therealong with a direction of polarization parallel to a first transverse axis orthogonal to said longitudinal axis, said device being further characterized by having second and third transverse optic axes orthogonal mutually and to said longitudinal axis and being disposed symmetrically at 45° to either side of said first transverse axis, whereby light propagating along said longitudinal axis polarized in the direction of said first transverse axis has a first component parallel to said second transverse axis and a second component parallel to said third axis, said first and second components traversing at different light velocities, and said device further having a pair of opposed boundary faces disposed perpendicularly to said second transverse optic axis;
    a pair of electrodes disposed in juxtaposition over positions of said opposed faces;
    a modular control network having input and output terminals, said output terminals being coupled to said electrodes for impressing thereon an electric error signal for altering the state of polarization of the monochromatic light propagating along said longitudinal axis and emerging from said device, whereby said emerging light has a predetermined state of polarization; and
    optic and electric signal conditioning means responsive to the light emerging from said device for analyzing the relative light intensity of said first and second components and for generating said error signal representative of the state of polarization of said emerging light, and for impressing said error signal upon said modulator control network, said modulator control network including means responsive to said error signal for generating a correction signal, thereby to maintain said predetermined state of polarization of said emerging light and to correct for the effect of temperature variation and misalignment of said device.

2. The invention according to claim 1 in which said electrooptic device includes a 45° Z-cut KDP crystal in which said first transverse axis is denoted the (111) optic axis; said second transverse axis is denoted (010); and said third transverse axis is denoted (001).

3. The invention according to claim 1 in which said optic and electric signal conditioning means includes in an optic cascade relation; wave plate means for receiving light emergent from said electrooptic device and delaying one of said components 90° with respect to the other;
    beam splitter means for dividing said emergent light into first and second substantially equal beam portions;
    first polarizer analyzer means interposed in the path of said first beam portion; and
    second polarizer analyzer means interposed in the path of said second beam portion.

4. The invention according to claim 3 in which said first and second polarizer analyzer means are polarized perpendicularly mutually and with respect to the direction of their respective paths of said first and second beam portions, said first and second analyzer means being polarized respectively perpendicularly and parallel to said direction of polarization of said light incident upon said electrooptic device.

5. The invention according to claim 4 in which said optic and electric signal conditioning means further includes first and second light signal detector means interposed optically to receive light signals respectively from said first and second analyzer means for generating, responsive to the amplitude thereof, first and second electric signals respectively.

6. The invention according to claim 5 in which said optic and electric signal conditioning means for generating said electrical error signal includes difference amplifier means, having first and second input terminals to said first and second light signal detector means, said difference amplifier being of the character.
    to provide said error signal proportional to the amplitude difference of said first and second electric signals from said light signal detector means.

7. The invention according to claim 1 which further includes active laser means having laser cavity defining end mirror means disposed longitudinally from each end of said electrooptic device whereby said longitudinal axis of the latter is disposed along on optic path extending between said end mirror means.

8. The invention according to claim 7 in which said electrooptic device includes a 45° Z-cut KDP crystal in which said first transverse axis is denoted the (111) optic axis; said second transverse axis is denoted (010); and said third transverse axis is denoted (001).

9. The invention according to claim 7 in which said optic and electric signal conditioning means includes in an optic cascade relation; wave plate means for receiving light emergent from said electrooptic device and delaying one of said components 90° with respect to the other
    beam splitter means for dividing said emergent light into first and second substantially equal beam portions;
    first polarizer analyzer means interposed in the path of said first beam portion; and
    second polarizer analyzer means interposed in the path of said second beam portion.

10. The invention according to claim 9 in which said first and second polarizer analyzer means are polarized perpendicularly mutually and with respect to the direction of their respective said paths of said first and second beam portions, said first and second analyzer means being polarized respectively perpendicularly and parallel to said direction of polarization of said light incident upon said electrooptic device.

11. In a laser system, including a laser cavity, apparatus for stabilizing an electrooptical crystal, said apparatus comprising:
    an electrooptic crystal exhibiting optical birefringence as a function of an electric field, said crystal being adapted to be disposed in the laser cavity, said crystal having a longitudinal axis for the propagation of plane polarized light, with a direction of polarization parallel to a first transverse axis orthogonal to said longitudinal axis, said crystal having further a second and a third transverse optic axis mutually orthoganal to said longitudinal axis and being disposed symmetrically at substantially 45° to either side of said first transverse axis, said crystal having a pair of opposed faces disposed perpendicularly to said second transverse optic axis;

electrodes disposed over at least portions of said opposed faces;

optical means interposed into the path of said plane polarized light emerging from said crystal for causing said plane polarized light to become circularly polarized;

means interposed into the path of circularly polarized light and including two light sensitive detectors for detecting the amplitude of two components of said circularly polarized light, each component being plane polarized in directions mutually perpendicular to each other; and electric amplifier means for converting the output of said light sensitive detectors into an electric error signal in response to the light intensities of said two components being unequal and for feeding back said error signal upon said electrodes, thereby to maintain said predetermined plane of polarization in spite of variations in temperature or misalignment of said crystal.

References Cited

UNITED STATES PATENTS

| | | | |
|---|---|---|---|
| 3,215,480 | 11/1965 | Buhrer | 250—199 |
| 3,328,723 | 6/1967 | Giordmaine et al. | |
| 3,402,002 | 9/1968 | Eden | 250—199 |

ROBERT L. GRIFFIN, Primary Examiner

A. J. MAYER, Assistant Examiner